(12) United States Patent
Aljadeff et al.

(10) Patent No.: US 8,208,939 B2
(45) Date of Patent: Jun. 26, 2012

(54) DUAL BANDWIDTH TIME DIFFERENCE OF ARRIVAL (TDOA) SYSTEM

(75) Inventors: Daniel Aljadeff, Kiriat Ono (IL);
 Reuven Amsalem, Nes-Ziona (IL);
 Amir Lavi, Rehovot (IL); Adi Shamir,
 Kidron (IL)

(73) Assignee: Aeroscout Ltd., Park Tamar—Rehovat (IL)

( * ) Notice: Subject to any disclaimer, the term of this patent is extended or adjusted under 35 U.S.C. 154(b) by 975 days.

(21) Appl. No.: 12/025,184

(22) Filed: Feb. 4, 2008

(65) Prior Publication Data

US 2008/0186231 A1  Aug. 7, 2008

Related U.S. Application Data

(60) Provisional application No. 60/888,220, filed on Feb. 5, 2007.

(51) Int. Cl.
 *H04W 24/00* (2009.01)
(52) U.S. Cl. ............... 455/456.1; 455/456.2; 455/456.3
(58) Field of Classification Search ............... 455/456.1,
 455/456.2, 456.3, 404.1, 404.2, 456.5, 502,
 455/507, 552.1; 342/457, 357.72, 450, 357.16
 See application file for complete search history.

(56) References Cited

U.S. PATENT DOCUMENTS

| | | | |
|---|---|---|---|
| 5,883,598 A * | 3/1999 | Parl et al. ..................... | 342/457 |
| 6,091,362 A | 7/2000 | Stilp et al. | |
| 6,300,903 B1 | 10/2001 | Richards et al. | |
| 6,483,461 B1 | 11/2002 | Matheney et al. | |
| 6,538,600 B1 * | 3/2003 | Richton et al. ............ | 342/357.43 |
| 6,674,403 B2 | 1/2004 | Gray et al. | |
| 6,882,315 B2 | 4/2005 | Richley et al. | |
| 7,132,981 B1 | 11/2006 | Roberts | |
| 7,269,427 B2 | 9/2007 | Hoctor et al. | |
| 7,280,615 B2 | 10/2007 | Roberts | |
| 7,304,609 B2 | 12/2007 | Roberts | |
| 7,312,752 B2 | 12/2007 | Smith et al. | |
| 2003/0013146 A1 | 1/2003 | Werb | |
| 2004/0072582 A1 | 4/2004 | Aljadeff | |
| 2004/0157621 A1 | 8/2004 | Yamasaki et al. | |
| 2005/0192024 A1 | 9/2005 | Sheynblat | |
| 2005/0238113 A1 | 10/2005 | Santhoff et al. | |
| 2005/0288033 A1 * | 12/2005 | McNew et al. ............ | 455/456.1 |

OTHER PUBLICATIONS

European Search Report for EP08737608, mailed Apr. 27, 2011 (10 pages).

* cited by examiner

*Primary Examiner* — Jean Gelin
(74) *Attorney, Agent, or Firm* — Finnegan, Henderson, Farabow, Garrett & Dunner LLP

(57) ABSTRACT

A wireless location system has at least one wireless tag to be located by the wireless location system, wherein the at least one wireless tag transmits two wireless signals having a known time relationship and having different bandwidths. A plurality of receivers is provided wherein a first receiver receives and processes a first of the two wireless signals and estimates a time to arrive (TOA) of the first wireless signal, and a second receiver receives and processes a second of the two wireless signals and estimates a TOA of the second wireless signal at the second transceiver. The plurality of receivers is time synchronized based on a common timing signal. A location server is coupled to each of the plurality of receivers. The location server receives the TOA of the first wireless signal from the first receiver and the TOA of the second wireless signal from the second receiver. The location server calculating a TDOA of the two wireless signals and estimates a position of the at least one wireless tag based on the TDOA.

19 Claims, 5 Drawing Sheets

DUAL BANDWIDTH TIME DIFFERENCE OF ARRIVAL (TDOA) SYSTEM

RELATED PATENT APPLICATIONS

The present application is related to and claims the benefits of U.S. Provisional Application entitled "DUAL BANDWIDTH TDOA SYSTEM", filed Feb. 5, 2007, having a Ser. No. 60/888,220 and in the name of the same inventors listed above.

The present application is also related to U.S. patent application entitled "METHOD AND SYSTEM FOR LOCATION FINDING IN A WIRELESS LOCAL AREA NETWORK", filed on Aug. 20, 2002, having a Ser. No. 10/225,267; U.S. Pat. No. 6,968,194, entitled "METHOD AND SYSTEM FOR SYNCHRONIZING LOCATION FINDING MEASUREMENTS IN A WIRELESS LOCAL AREA NETWORK", issued on Nov. 22, 2005; and U.S. Pat. No. 6,963,289, entitled "WIRELESS LOCAL AREA NETWORK (WLAN) CHANNEL RADIO-FREQUENCY IDENTIFICATION (RFID) TAG SYSTEM AND METHOD THEREFOR", issued on Nov. 8, 2005; the specifications of which are herein incorporated by reference.

FIELD OF INVENTION

The present invention relates generally to wireless networks, and more specifically, to a method and system to improve location accuracy while maintaining the advantages of an IEEE 802.11x based location system.

BACKGROUND OF THE INVENTION

In many WLAN and other wireless data networks implementations, it is beneficial for the system owner to know the physical location of mobile clients or compatible tags. This will enable new features such as enhanced network security, providing of 'location based' services, asset tracking and many others.

A typical 'location finding' system, as currently implemented in the related patents and patent applications disclosed above, consists of multiple 'location transceivers' connected to the WLAN system, either by means of CAT-5 backbone or by wireless bridges. The typical 'location transceiver' contains a WLAN receiver and the circuitry required to extract Time of Arrival (TOA) information and report this information to the location server of the system. The 'location server' performs the required computation of the client or tag location based on the known location of the location transceivers, and displays it to the user or reports it to the requesting application.

In an IEEE 802.11a/b/g/n based Time Difference of Arrival (TDOA) location system, the TDOA of each pair of location transceivers is calculated from the reported TOA's that are calculated on a single 802.11a/b/g/n transmitted message. In a wireless local area data communication system, the Location Transceivers may be attached and/or integrated and/or be a part of the Access Points in said network.

The time synchronization of such a system using wireless or wired methods has also been previously done. Regarding wireless synchronization, U.S. Pat. No. 6,968,194 B2, entitled "METHOD AND SYSTEM FOR SYNCHRONIZING LOCATION FINDING MEASUREMENTS IN A WIRELESS LOCAL AREA NETWORK", describes a location system in which multiple location receivers compute the time-of-arrival (TOA) of a reference transmitter signal, which is generally a beacon signal. The TOAs are collected and reported to a master unit that contains stored predetermined position information for the location receivers. The master unit computes the time-differences-of-arrival (TDOA) between multiple receivers and computes differences between the measured TDOAs and theoretical TDOAs computed in conformity with the predetermined position of each location receiver. The deviations between theoretical and measured TDOAs are collected in a statistical sample set and Kalman filters are used to produce a model of location receiver timebase offset and drift over multiple received beacon signals. The filter outputs are used to then either correct subsequent TDOA measurements for each location receiver, improving the accuracy of subsequent and/or prior TDOA measurements, or commands are sent to the location receivers to calibrate the timebases within the location receivers in order to improve the accuracy of subsequent TOA measurements.

The location accuracy of such a system is determined among many other factors by the accuracy of the TOA as calculated by the Location Transceivers and/or Access Points. The accuracy of the TOA, especially in multipath environments, is strongly affected by the bandwidth of the received signal and the limited bandwidth of the IEEE 802.11a/b/g/n signals is a strong limiting factor in achieving better location accuracy than 1-2 m.

In some location systems it is desirable to achieve an improved location accuracy compared to the accuracy achieved by IEEE 802.11a/b/g/n systems. It's well known that the location accuracy is strongly affected by the accuracy of the estimated TOA by each of the location transceivers, and the TOA maximum accuracy is mainly determined by the bandwidth of the received signal. Other factors as the signal SNR, time synchronization of the transceivers, modulation type, number of transceivers, etc. also affect the location accuracy.

Ultra wide band (UWB) systems have been designed to allow digital communication at very high data rates by using very wide spectrum bands (typically more than 500 MHz). Since the use of this huge band overlaps many other licensed and unlicensed bands, this technology has been limited to very low average transmission power (an average of less than −40 dBm/MHz) thus strongly limiting the communication range.

However, the use of those extremely wide bands is beneficial for time based location systems, since it allows a very accurate and precise TOA measurement in addition to an excellent separation of multipaths, even in the presence of very close multipaths (up to 20-30 nsec).

Therefore, a well designed UWB location system can achieve a typical location accuracy of ±1 feet while in several cases it's possible to achieve a location accuracy of few inches. However as previously mentioned, the range of such location systems is limited, in addition to other limitations as imposed by the regulatory bodies.

In such a location system (either IEEE 802.11a/b/g/n or UWB), a tag or standard client is required to transmit one or several messages to allow all those location transceivers or AP's to receive and measure the TOA of the transmitted messages. Those location transceivers maybe time synchronized by cables and/or over the air. The location transceivers calculate the TOA of each received message and report those values to a server which calculates the tag or mobile unit position. However, as stated above, both systems have some disadvantages.

Therefore, it would be desirable to provide a method and system to overcome the above problems. The system and method would provide a combined (IEEE 802.11a/b/g/n and UWB) location system in which the integration of both technologies provides a location system with significant advantages not present on each of those technologies separately.

SUMMARY OF THE INVENTION

In accordance with one embodiment of the present invention, a wireless location system is disclosed. A wireless location system is disclosed. The wireless location system has at least one wireless tag to be located by the wireless location system, wherein the at least one wireless tag transmits two wireless signals having a known time relationship and having different bandwidths. A plurality of receivers is provided wherein a first receiver receives and processes a first of the two wireless signals and estimates a time to arrive (TOA) of the first wireless signal, and a second receiver receives and processes a second of the two wireless signals and estimates a TOA of the second wireless signal at the second transceiver. The plurality of receivers is time synchronized based on a common timing signal. A location server is coupled to each of the plurality of receivers. The location server receives the TOA of the first wireless signal from the first receiver and the TOA of the second wireless signal from the second receiver. The location server calculating a TDOA of the two wireless signals and estimates a position of the at least one wireless tag based on the TDOA In accordance with another embodiment of the present invention, a method for estimating a time to arrive of a wireless transmission at a wireless receiver is disclosed. The method comprises: transmitting an UWB signal and a narrower band signal from a single wireless device, the UWB signal and a narrower band signal having a known time relationship; receiving the UWB signal and the narrower band signal at a receiver unit, the receiver unit processing the UWB signal and a narrower band signal and estimates a time of arrival (TOA) of the UWB signal and a TOA of the narrower band signals; and selecting an earliest TOA between the TOA of the UWB signal and the TOA of the narrower band signal.

In accordance with another embodiment of the present invention, a method for calculating a time difference of arrival (TDOA) of a wireless transmission at a plurality of wireless receivers is disclosed. The method comprises: transmitting two wireless signals with known time relationship between them having different bandwidths by a single wireless device; receiving and processing a first of the two wireless signals and estimating a time of arrival (TOA) of a first of the two wireless signals by a first transceiver, receiving and processing a second of the two wireless signals and estimating a TOA of a second of the two wireless signals by a second transceiver; transmitting the first TOA and second TOA by the first and second transceivers to a common location server; and calculating the TDOA of the two wireless signals from a difference of the TOA of the first signal and the second TOA of the second signal.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DESCRIPTION OF THE INVENTION

The present invention describes a method, system and units of a dual bandwidth TDOA location system 1. More specifically the present invention applies to a TDOA location system 1 integrating UWB technology with a narrower band WLAN/ WPAN communication system. It also applies to methods of TOA and TDOA calculation of dual bandwidth transmissions. The present invention further describes a wireless transmitter able to transmit a dual bandwidth signals and a receiver able to receive and process such dual bandwidth transmissions. In accordance with one embodiment of the present invention, the WLAN system 1 will consist of an IEEE 802.11a/b/g (i.e. anyone of IEEE 802.11a, IEEE 802.11b or IEEE 802.11g and the like) but the same principles and ideas can be implemented using other communication standards as IEEE 802.11n or IEEE 802.16.1 (ZigBee) and the like. In general, any description in this document which mentions WLAN signals is applicable to narrow band signals (compared to UWB) or to any of the IEEE WLAN standards as IEEE 802.11a/b/g but also to other standards as IEEE 802.11n, IEEE 802.16.1.

The method can be implemented in tags as well as in any standard wireless client operating in such networks. For the sake of simplicity, any reference to tags in this document, applies also to mobile units or standard clients and vice versa. In addition any reference in this document to a location transceiver is fully applicable to an access point having the capability to measure the TOA (Time of Arrival) of a received message. In respect to receiver functions, a reference to location transceivers is also applicable to location receivers (units which have no transmitters) which can be part of a location system. In another embodiment, the location transceiver may be attached and/or integrated and/or be a part of the access point.

Figure 1:
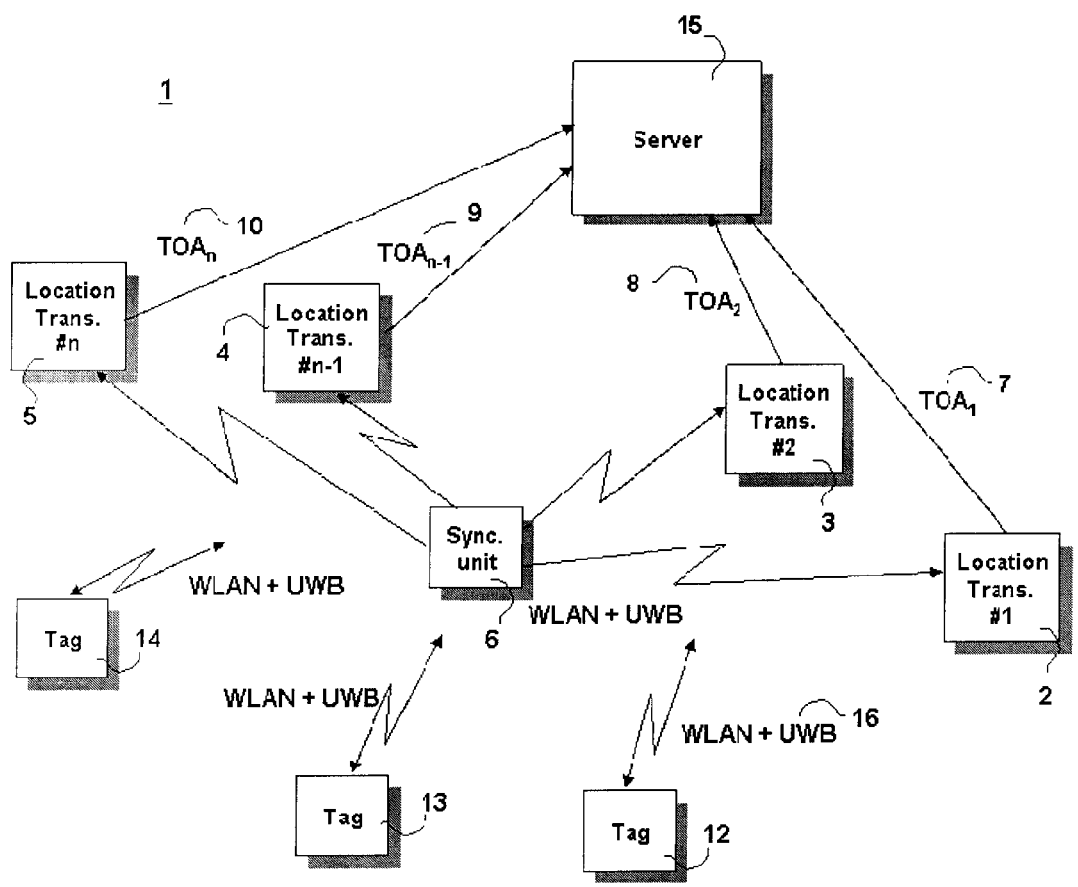
FIG. 1 is a pictorial diagram depicting a wireless network organized in accordance with an embodiment of the present invention.

Referring now to the figures and in particular to FIG. 1, a WLAN network 1 within which the present invention is embodied is depicted in a pictorial diagram. Fixed-position location transceivers 2-5 within the wireless network 1 are associated in a group, although not necessarily all fixed-position location transceivers 2-5 within wireless network 1 will be assigned to any group.

According to one embodiment of the network 1 as depicted in FIG. 1, it consists of N location transceivers 2-5 (N=2 or more) which are wirelessly synchronized by a sync unit 6. All the location transceivers 2-5 have data communication (wired or wireless) with a server 15 operatively connected to the location transceivers 2-5.

Sync unit 6 includes a transmitter able to transmit WLAN messages and/or UWB messages. In different embodiments of the present invention, the sync unit 6 maybe one of the location transceivers 2-5, a tag 12-14, or a combination of both. In other embodiments, more than one sync unit 6 can be used to synchronize the location transceivers 2-5.

According to another location system embodiment, the time synchronization between the Location transceivers is achieved by a wired distribution of a common timing signal.

In essence, time synchronization of the location transceivers 2-5 may be performed as described in prior art publications. The present invention focuses on the advantages of combining WLAN (e.g. Wi-Fi) and UWB technologies for time synchronization and for location estimation.

According to the embodiment as depicted in FIG. 1, the sync unit 6 as well as one or more tags 12-14 are in wireless range with the location transceivers 2-5, and transmit either a WLAN signal alone or a combination of WLAN and UWB signals 16 as will be described below.

The transmitted WLAN and UWB signals are tied together and have a known time relationship between them and considered to be transmitted synchronously for the purpose of TOA calculation in a receiver, receiving both signals.

According to one embodiment of the present invention, the location transceivers 2-5 are able to receive the WLAN signals transmitted by a tag 12-14 or the sync unit 6, while part or all of the location transceivers 2-5 can also receive the UWB signals when those are transmitted in conjunction with the WLAN signal. Therefore, location transceivers 2-5 that are able to receive WLAN signals only, will measure the TOA 7-10 of those WLAN signals, while other location transceivers 2-5 that are able to receive both WLAN and UWB signals can measure and report to the server 15 the TOA 7-10 of either one of the signals or both signals in case both are received. In another embodiment of the present invention, the location transceivers 2-5 will select and report the earliest TOA value.

Since there is a known time relationship between the transmitted WLAN and UWB signals (both signals are synchronized) by the tag 12-14 or the sync unit 6, the server 15 can use either one of the reported TOAs (calculated from either the WLAN or UWB signal) to perform TDOA calculations. This means that the TDOA calculated from the TOA values, estimated and reported by two different location transceivers 2-5, both receiving a specific combined WLAN+UWB transmission, and where one of the location transceivers 2-5 measured the WLAN signal and another location transceivers 2-5 measured the UWB signal, is a valid TDOA since both TOA were estimated from synchronized signals having a known time relationship as described above. This unique and novel combination of both communication technologies enables the location system 1 to achieve very significant and exclusive advantages as following described.

Still referring to FIG. 1, the server 15 can perform time synchronization between all the location transceivers 2-5 in a group by using TOA values that were estimated from either a WLAN or UWB signals. Since TOA values estimated from UWB signals have typically much better accuracy and reliability, the server 15 can assign a different quality factor to each location transceiver 2-5 and take this in account in the location calculation process. In a similar way, a tag 12-14 transmitting a combined signal maybe located from TOA values estimated from UWB or WLAN signals. This hybrid type of location has a huge advantage in respect to the short ranges of the UWB signals. For example, a pure UWB TOA-based location system cannot locate a tag with less than three receivers and in many cases four receivers are needed to achieve a good location. This minimum number of receivers dictates a minimum receiver density that shall be deployed in order to have location everywhere. Since the UWB range is shorter than the WLAN range, the receiver density is higher. Using the system 1 as described in this invention, a location can be made even by having only one or two TOA values estimated from UWB signals. The rest of the TOA values can be from WLAN signals.

Although this hybrid location can suffer from some accuracy degradation compared to a pure UWB location, it is much better than a pure WLAN location and it doesn't require a higher density in the location transceiver 2-5 deployment. Moreover, the server 15 can assign a better quality factor to TOA values estimated from UWB signals and take it in account as a weighing factor in the location process. In one embodiment, the server 15 can be programmed for a minimum number of UWB-based and/or WLAN-based TOA values to calculate and report a valid location. In another embodiment, the server 15 can report (e.g. via APIs) a quality factor of the location based on the number of UWB-based and/or WLAN-based TOA values used for the location process. This quality factor can also combine the synchronization quality of each of the transceivers.

For example, in a preferred embodiment of the system 1 the quality of a TOA used for location can be rated as follows:

| Quality level | Receiver synchronization | Received tag signal |
| --- | --- | --- |
| 1 - Highest | UWB | UWB |
| 2 | WLAN | UWB |
| 3 | UWB | WLAN |
| 4 - Lowest | WLAN | WLAN |

There are several ways of using this quality factor in the location process (e.g. co-variance matrix, weigh factor during best fit process, etc.) but a detailed description is beyond the scope of the present invention.

Combined UWB and WLAN signals maybe used in additional ways to improve the performance of the location system 1. In a preferred embodiment, floor and cell differentiation can be performed based on the UWB signals. Since these signals are strongly attenuated by concrete floors, the server 15 can use them as an indication of tag presence in a specific floor.

In another implementation of the system 1 according to the present invention, the time synchronization between all the location transceivers 2-5 in a group can be done differently from the description above. The location transceivers 2-5 can be synchronized using WLAN signals and from time to time (e.g. every few seconds or minutes), UWB signals are used to detect synchronization offsets and compensate them. This is a significant advantage in cases where strong multipaths cause high offsets in WLAN synchronization. This method is applicable even when the UWB and WLAN signals are not tied together and transmitted synchronously. The server 15 will basically synchronize the clocks of the location transceivers 2-5 using the UWB signals but maintain short time synchronization (few seconds or minutes) using WLAN signals.

In another embodiment, the location transceivers 2-5 receiving both UWB and WLAN signals can calculate by itself the offset of the WLAN signal (based on the UWB signal) and report a corrected value. In other cases it can decide which signal has better quality and report the TOA based on the best signal quality. The same offset can be used by the location transceiver 2-5 to learn about the presence and timing of multipaths in the WLAN signal. Although those are two signals with different characteristics, having a good estimate of the expected TOA of the WLAN signal it is possible to learn more about the channel characteristics and use this information when UWB signals are not received.

Figure 2:
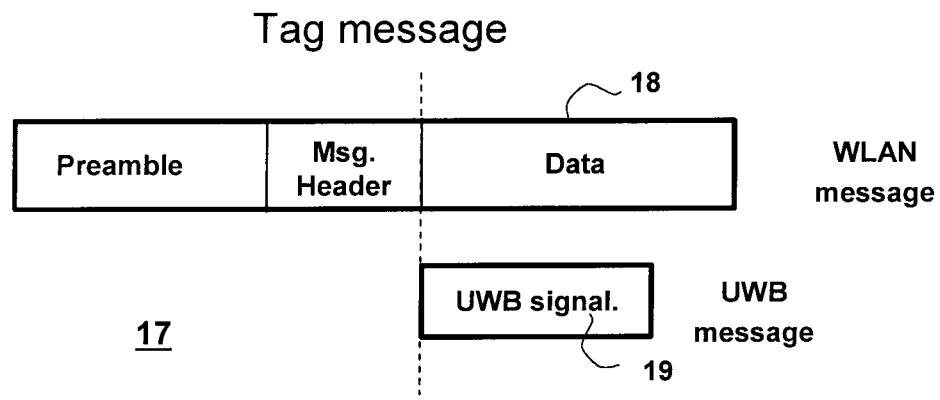
FIG. 2 is a diagram showing the combined tag message of a tag used in the wireless network of the present invention.

Now referring to FIG. 2, an embodiment of the combined tag message of the tag 12-14 is depicted. The WLAN message 18 has a known format including a preamble, header and data fields. In a typical location system, the data fields will carry tag identification as well as telemetry data. According to an embodiment of the present invention, the UWB signal 19 consists of a sequence of UWB pulses carrying no data (i.e. the UWB receiver receiving this signal is not requested to decode any data from this signal). Since both signals are transmitted by the same tag 12-14, there is no need to transmit data in both the UWB 19 and WLAN 18 signals. In this embodiment, all the tag data is included in the WLAN message only. This is a major advantage in respect to the effective range of the UWB signal. In a pure UWB Location system, each UWB signal carries the tag identification which requires from the UWB receiver to receive the message with no errors (since normally only CRC codes are used to protect the information). In that case, the effective range of the UWB signal is limited by the energy of a single bit. As previously mentioned and according to this preferred embodiment, the UWB signal is only used for TOA estimation. This means that the UWB receiver can improve the SNR of the received signal by integrating part or all of the received UWB pulses. The range limitations imposed by the $E_b/N_o$ of a single pulse are now considerably improved.

Also according to this embodiment, the UWB signal 19 is transmitted after some of the WLAN fields have been transmitted (e.g. after the message header). A combined UWB+WLAN location transceiver 2-5 can take advantage of this scheme to start receiving the UWB signal at a given and well specified time window. This is another advantage of this combined transmission, since a pure UWB receiver shall set a detection threshold high enough to avoid excessive false alarms (due to in-band noise). In this case, the UWB receiver sensitivity can be improved by starting the UWB detection at a well defined time given by the received WLAN signal. Moreover, the WLAN message header may include an indication (e.g. UWB flag) indicating whether or not an UWB signal is also being transmitted.

In other embodiments, the UWB pulse train can include data and/or be modulated using a spread spectrum direct sequence. Using spread spectrum modulation is especially useful in WLAN systems working in different channels. In this case, two tags transmitting in two different WLAN channels may overlap in time and therefore also the UWB signals will overlap thus creating a potential identification problem (of the UWB signal) in the receiver. Modulating the UWB signal with orthogonal sequences (one for each WLAN channel) will allow the receiver to easily differentiate between two overlapping UWB sequences. Among other well known techniques, Pulse Position Modulation can also be used to differentiate between two or more overlapping UWB sequences, which can also be related to the timing of the WLAN signal. Using direct sequence modulation is also beneficial for obtaining a better SNR of the received signal. In other cases, the UWB pulse train can be transmitted at the beginning of the WLAN signal or even without any overlap to it (before or after it).

Another major advantage of this combined transmission is achieved by the CCA (Clear channel assessment) process done for the WLAN signal. Therefore, the UWB transmitted signal is more likely to be clean (although CCA does not guarantee it by 100%) from interference or overlap of other units transmitting also combined UWB+WLAN signals. Since typical UWB systems do not use any CCA mechanism (pure Aloha), the channel usage (directly related to the system capacity) is limited to around 18%. With the combined transmission, the system operates in a slotted-Aloha mode thus improving the channel usage to around 36%. In other cases, this CCA mechanism can be used to avoid UWB interference to other communication systems as requested by some regulatory organizations. Other advantages from this combined UWB+WLAN tag transmission will be clear from the description below.

Figure 3:
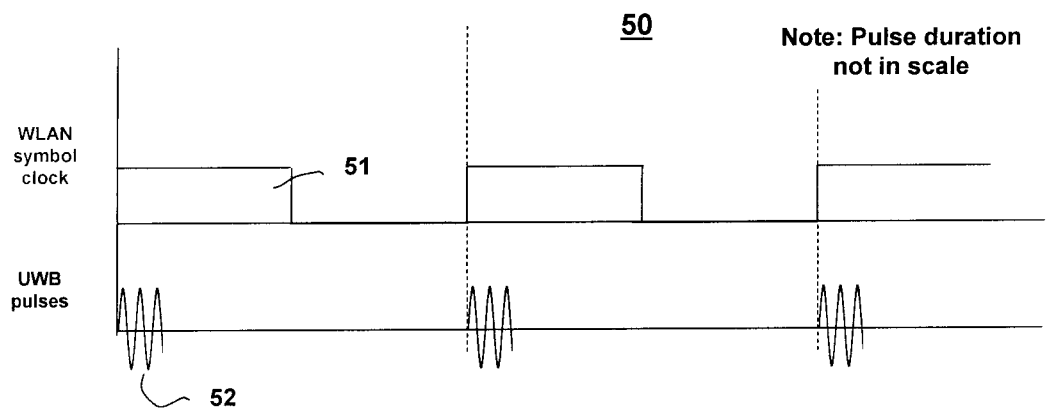
FIG. 3 is a detailed timing diagram of a combined UWB+ WLAN signal used in the wireless network of the present invention.

Referring now to FIG. 3, a detailed timing of a combined UWB+WLAN signal 50 is depicted. According to this embodiment, the UWB pulse 52 is transmitted at the rising edge of the WLAN signal symbol clock 51. Consider an IEEE 802.11b WLAN signal, using a 1 Mbps symbol clock, the UWB pulse 52 (which may consist of one or few UWB carrier cycles). In this case, the UWB pulses 52 will be transmitted at a rate of 1 Mbps (the WLAN signal symbol rate). Having a known time relationship between the WLAN and UWB signals is beneficial in many aspects.

The main one as previously explained, is the possibility to calculate the TDOA of a combined signal from two synchronized location transceivers 2-5, one of the location transceivers 2-5 estimating the TOA of the UWB signal and the other location transceivers 2-5 estimating the TOA of the WLAN signal. Since in the vast majority of the cases, the WLAN signal will be received with a better SNR than the UWB signal (due to the higher transmitted power), a combined location transceivers 2-5 can use the symbol clock of the received WLAN signal as the approximate timing of the UWB signal. In some extreme cases, and due to large multipaths, this timing can be significantly distorted but in most of the cases it can define a suitable time window (e.g. ±100-200 nsec) for the UWB reception. By reducing the search window of the location transceivers 2-5 receiving the UWB signal, one can improve its sensitivity. For example, when operating in a noisy channel, there is a higher probability to miss the detection of a UWB pulse with a noise peak. By reducing the time slot, the location transceivers 2-5 receiving the UWB signal is less likely to have such a missed detection and more likely to measure the time of the right pulse. This increased sensitivity of the location transceivers 2-5 receiving the UWB signal can contribute to an increased UWB effective reception range, which will increase the area in which a specific tag 12-14 is located thus providing an advantage over a pure UWB location system. This time window can be programmable or automatically adjusted by the location transceivers 2-5 themselves.

Since in some preferred embodiments, the UWB pulse train includes no data (e.g. a train of all "ones"), the TOA of the UWB signal will have a time ambiguity of the UWB pulse interval (e.g. 1 μsec in the example above). This ambiguity can be resolved using the WLAN signal as a reference but also by assuming that the UWB signal cannot be received at distances of more than half of the distance the signal propagates in one time interval (e.g. in this case ~150 m). In case this distance is too short, the spacing between the UWB pulses can be increased (e.g. 2 μsec). Many other well known techniques can be used to solve this ambiguity problem.

In other implementations, the timing of the UWB signal can be related to the chip clock or to any other time reference in the transmitted WLAN signal. When related to a chip clock (e.g. an 11 MHz clock in an IEEE 802.11b WLAN system), a non-coherent location transceivers 2-5 will be able to integrate many UWB pulses without significant losses due to the difference between the transmitter and receiver clock. In this case, ambiguity problems (as described above) can be solved by modulating the UWB signal with a Direct Sequence or other methods.

The transmitted UWB signal 52 can be modulated in many ways and using any modulation with UWB bandwidth. The modulation type will normally be selected according to the system requirements. Typical examples include Pulse Amplitude Modulation (PAM), ON-OFF Keying (OOK), Bi-phase Shift Keying (BPSK) and Pulse Position Modulation (PPM), but more sophisticated modulations as SPSP-DS or multi-band OFDM can also be used.

Figure 4:
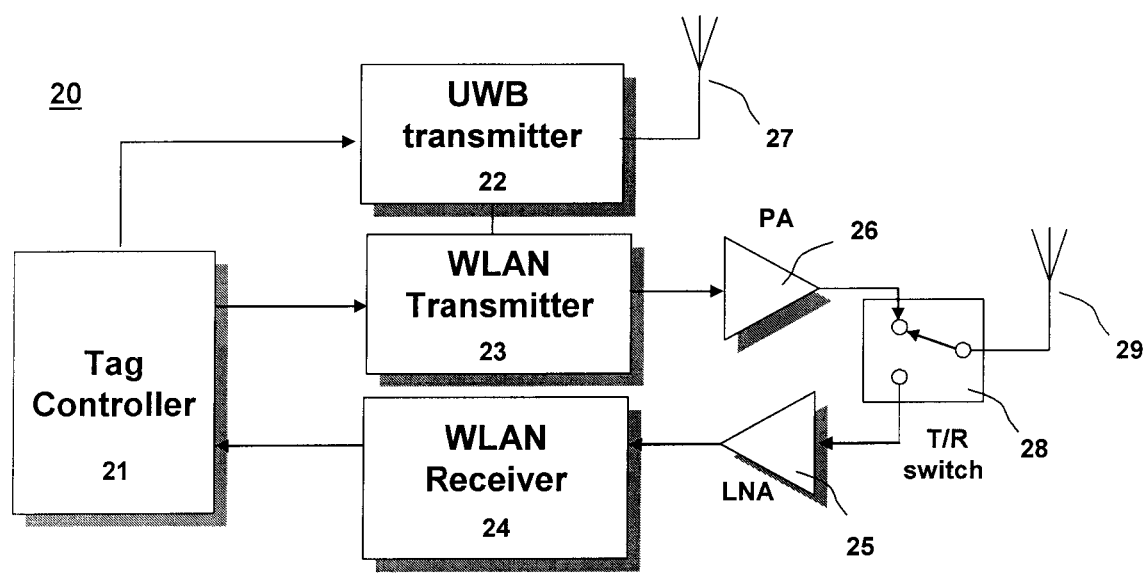
FIG. 4 is a simplified block diagram of a combined UWB+ WLAN tag used in the wireless network of the present invention.

Referring now to FIG. 4, a block diagram of a combined UWB+WLAN tag 20 is depicted. The tag 20 may be used in the system 1 as one or more of the tags 12-14. In this embodiment, the tag 20 consists of a Tag controller 21, a WLAN transmitter 23, WLAN receiver 24, an UWB transmitter 22, a WLAN power amplifier (PA) 26, a Low Noise Amplifier (LNA) 25, a T/R switch 28 and a WLAN antenna 29. The UWB signal is transmitted using a separate antenna 27. The tag controller 21 controls the whole operation of the tag 20 including message preparation, transmitter and receiver control and any other task required to ensure proper tag operation. The UWB transmitter 22 and WLAN transmitter 23 are interconnected to provide common timing required during transmission.

In a preferred embodiment, the UWB transmission is performed at a carrier frequency of 6.5 GHz and a bandwidth of 500 MHz. The transmission power is according to the FCC regulations as it does not exceed the emission limits of –41.3 dBm/MHz.

In other preferred embodiments the UWB signal is transmitted with an UWB carrier frequency in the range of 3.1-10.6 GHz and a bandwidth equal or greater than 500 MHz.

According to one embodiment of the present invention, a typical combined UWB+WLAN location system will include tags transmitting combined UWB+WLAN signals but which can only receive WLAN signals.

The WLAN transmitter 23 can be used to transmit any kind of tag identification as well as other telemetry data such as tag status, sensor data, external host data, etc. The WLAN transceiver can be used to send any required information to the tag including programmable parameters, download firmware, etc. Having 2-way communication is beneficial for secure and reliable communication requiring Ack/Nack mechanism, encryption and authentication. This is another main advantage of this combined system 1 according to the present invention. A pure 2-way UWB tag requires the implementation of a UWB receiver in the tag which significantly complicates it and increases its cost. Since there is no need for an additional data downlink (from the system to the tag), the UWB receiver in the tag can be avoided.

In other embodiments of the tag 20, where only 1-way communication (from the tag to the system) is required, it is also possible to remove the WLAN receiver 24 too or leave just an energy detector for CCA purposes.

Referring now to the tag antennas 27 and 29, those units can be implemented as a single dual-band antenna with a single feed point (UWB+WLAN) or as two antennas assembled together with two separates feed points.

Figure 5:
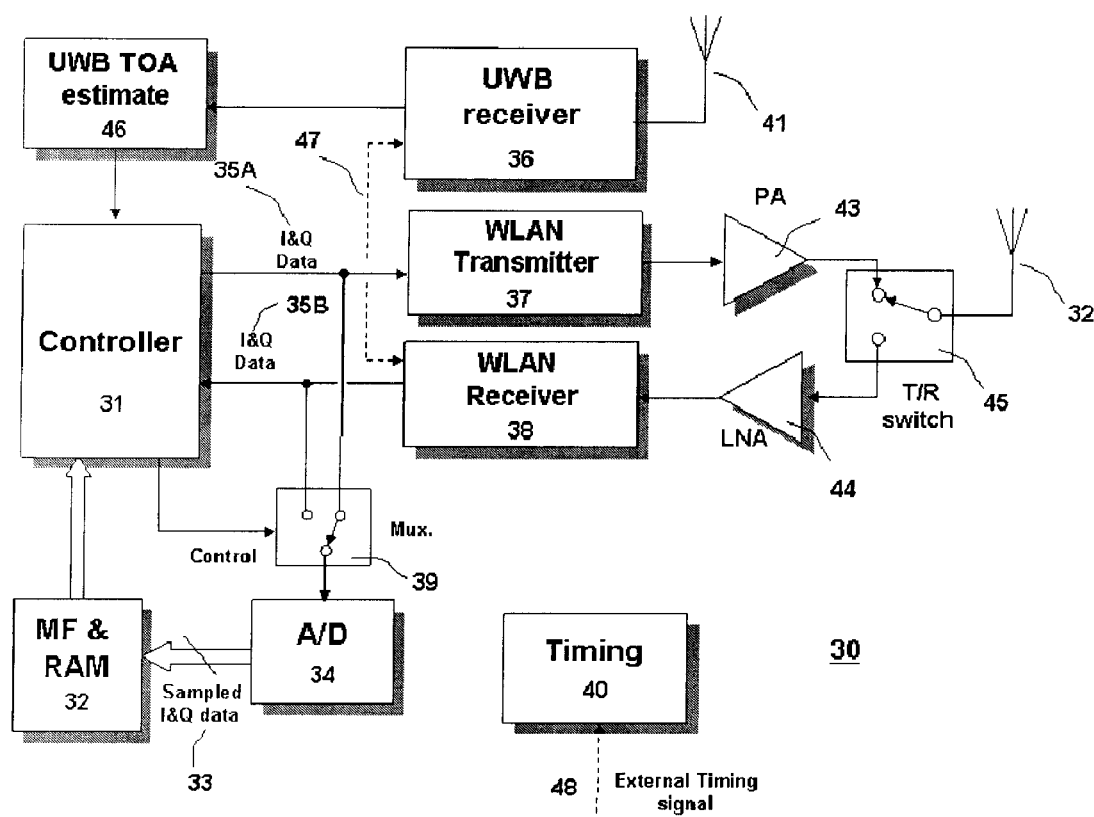
FIG. 5 is a simplified block diagram of a location transceiver used in the wireless network of the present invention.

Referring now to FIG. 5 below, one embodiment of a location transceiver 30 is depicted. The location transceiver 30 may used in the system 1 as one or more of the location transceivers 2-5. The location transceiver 30 typically consists of a controller 31, a WLAN transmitter 37 and WLAN receiver 38, a WLAN signal power amplifier 43, a WLAN signal low noise amplifier 44, a T/R switch 45 and WLAN signal antenna 32, an UWB receiver 36 with UWB antenna 41 and timing function 40. Although not shown in the block diagram, the timing function 40 interfaces with most of the functions in the transceiver unit. The timing function 40 includes an internal time source (e.g. TCXO or OCXO) and the related hardware (e.g. PLL, dividers, counters, etc.) to provide the required timing signals to other functions in the transceiver. Thus, this timing function 40 provides the source clock to generate the RF frequency in the WLAN transmitter 37 and WLAN receiver 38, the timing and clock for the UWB receiver 36, the sampling clock for the A/D 34, the timing of the Matched Filter and RAM 32 (e.g. address counter to store samples) and the TOA counting for the UWB TOA estimate function 46 and for the WLAN TOA estimate function performed by the controller 31. The location transceiver 30 further includes circuitry for the WLAN signal TOA estimation which includes an A/D converter 34 for sampling of the I&Q data 35A and 35B, a multiplexer 39 to select the I&Q signals to be sampled and a matched filter and RAM 32 to process and store the sampled signals 33 and circuitry to estimate the TOA of the received UWB signal 46. For the sake of simplicity external interfaces (e.g. power, Ethernet, etc.) are not shown. Also the use of diversity antennas is obvious and not depicted. According to this embodiment, the location transceiver 30 can handle both UWB and WLAN signals when those are transmitted together by a combined UWB+WLAN tag or when transmitted separately by two different tags.

The TOA estimation of a WLAN signal is performed by sampling the received I&Q 35B baseband signal and by using a matched filter to find the coarse timing of the received signal. The fine TOA of the WLAN signal is then estimated by the controller using signal processing techniques well known to the skilled in the art and beyond the scope of this invention. Sampling I&Q transmitted signals 35A allows the location transceiver 30 to accurately estimate the TOA of the transmitted WLAN signal and perform self synchronization functions as described in prior art publications.

The TOA estimate of the UWB signal can be performed by threshold detector or using more sophisticated well known techniques. As previously mentioned, the TOA can be estimated on an integrated UWB signal (the integration can be coherent or non-coherent and can be done inside the UWB TOA estimate block 46.

In another embodiment, the timing of the UWB receiver 36 can be synchronized 47 to the data received in the WLAN receiver 38. The UWB receiver 36 will detect the UWB signal in narrow time windows synchronized to the WLAN received data 35B.

The shown location transceiver 30 configuration as well as the use of I&Q signals for TOA estimation is just one of possible preferred embodiments. It's also possible to use low IF sampling or partial processing in IF and achieve the same functionality. To the skilled in the art, it should be obvious that different embodiments may include either two separate TOA estimate functions or a unified and combined function. In either one of those cases, both TOA estimate functions (separate or combined) use a common timing function 40 and therefore the estimated TOA values are both referenced to synchronized time counters.

In accordance with one embodiment, the timing function 40 includes two TOA counters used for time stamping of each of the received signals and those two TOA counters run synchronously from a common timing signal. Although those counters may have a different time resolution, they preferably have the same overall time cycle or alternatively times cycles which have a ratio between them equal to an integer n (where n=$2^k$, k=0, 1, 2, 3 . . . ). In another embodiment, the TOA counter is the same for both TOA estimate functions (UWB and WLAN).

In accordance with another embodiment, the timing function 40 is connected to an external timing signal 48 provided by a central clock source which provides this common timing signal to a plurality of transceivers through a wired interface. In that case, this plurality of transceivers operates with a synchronized time base generated by this common timing signal.

Another implementation may include two controllers 31, a master controlling the WLAN communication activity and a slave controlling the UWB reception activity. When the location transceiver 30 receives both UWB and WLAN signals, the location transceiver 30 can report both TOA values to the server 15 (FIG. 1) (both TOA values being referenced to a common time counter or to synchronized time counters) or just one according to a quality test performed by the transceiver controller. In addition, the controller can use the UWB-based TOA to learn the channel characteristics of the WLAN signal. Those channel characteristics (e.g. delay spread and multipaths) can be used by the transceiver controller 31 to better estimate the WLAN signal TOA when the UWB signal is not present.

In another embodiment, the location transceiver 30 can always report the estimated TOA of the WLAN signal but correct it according to the TOA of an UWB signal when such a signal is also received. That way the location server 15 deals with only one reported TOA from each location transceiver 30, those reports including a quality factor based on the received signals.

In another embodiment, a location transceiver 30 can receive and report the TOA of an UWB signal although the WLAN signal was not received (e.g. due to CRC error). Even in those cases where the UWB signal carries no data, it is possible to identify this signal based on other transceivers that received the WLAN signal (with the tag identification) and with a TOA very close to the TOA of the UWB signal received by the first transceiver. This identification is performed in the server 15 and allows using UWB signals for location even when the WLAN signal was properly received in at least one location transceiver.

Other embodiments of the location transceiver 30 may include the integration of a dual UWB receiver 36 which can be used for accurate Angle of Arrival (AOA) estimation of the UWB signal. A location server 15 using both TOA and AOA information will normally be able to calculate a more accurate location or even calculate a good location with only two location transceivers 30.

Figure 6:
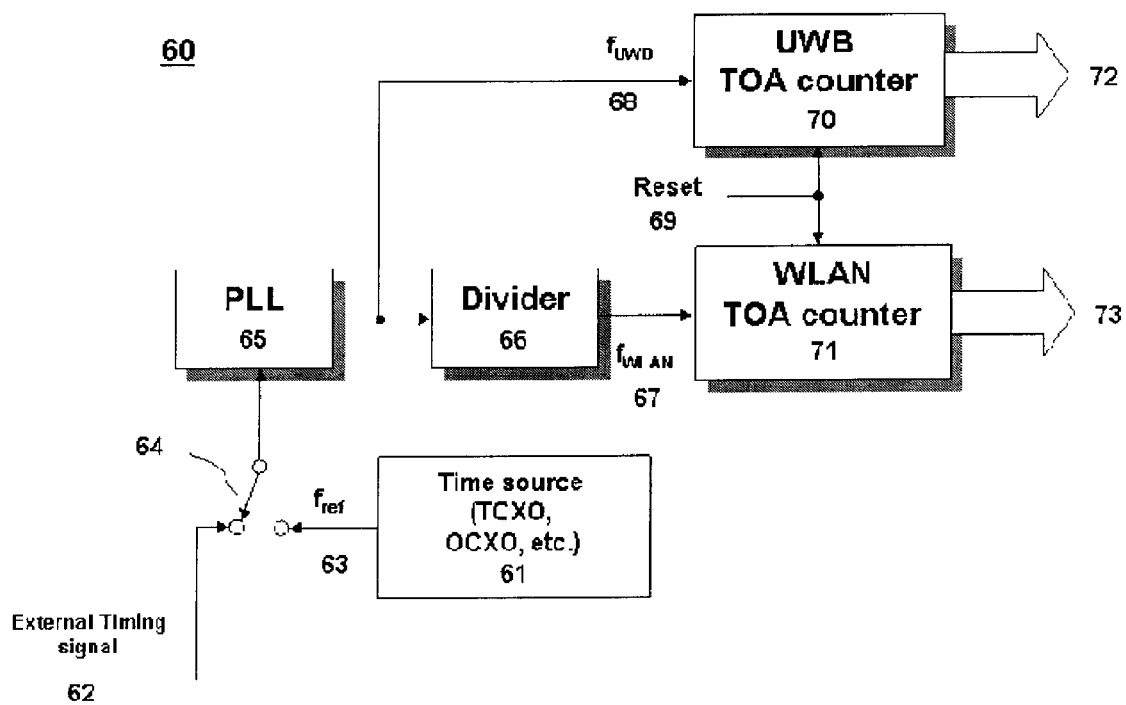
FIG. 6 is a simplified block diagram showing the TOA counters section comprised in the timing function of a location transceiver used in the wireless network of the present invention.

Now referring to FIG. 6, the TOA counters section 60 comprised in the timing function 40 (FIG. 5) of the location transceiver 30 (FIG. 5) is depicted. According to one preferred embodiment, this section includes two separate counters 70 and 71 for time stamping the TOA of the UWB 72 and WLAN 73 signals respectively. Those two counters may have different length and count at different frequencies $f_{WLAN}$ 67 and $f_{UWB}$ 68 but preferably those two frequencies have a ratio between them equal to an integer n (where n=2 k, k=0, 1, 2, 3 . . . ) since this significantly simplifies the TDOA calculations. To start counting from a known point, the TOA counters 70 and 71 are initialized from a common reset signal 69.

The clock source used to generate the counting frequencies $f_{WLAN}$ 67 and $f_{UWB}$ 68 is preferably provided by a good and stable crystal source (e.g. TCXO or OCXO) 61 but in other cases it can be externally provided by an external timing signal 62 commonly distributed to a plurality of transceivers by a central clock source. The controller 31 (FIG. 5) can select 64 which clock source is used. Also according to this preferred embodiment, the source clock is multiplied by a PLL 65 in order to achieve a higher counting frequency (e.g. 44-200 MHz) as required by the TOA functions. Typically the UWB TOA counter 70 will use a higher counting frequency due to the higher TOA resolution 72 used by the UWB TOA estimate function 46 (FIG. 5). For that reason a divider 66 is used to accordingly reduce the PLL 65 output frequency to the counting frequency 67 of the WLAN TOA counter 71.

In another preferred embodiment, both TOA counters 70 and 71 are implemented as a single counter, from which each TOA estimate function uses a specific section of this TOA counter.

The proposed dual bandwidth TDOA system 1 has many advantages as were described above. The proposed system leverages the advantages of either one of the two (WLAN and UWB) location systems and creates a combined system with an overall better performance than any separate system. Those additional capabilities include both an upgrade of the WLAN TDOA location system accuracy as well as an upgrade of the UWB location system coverage.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

What is claimed is:

1. A wireless location system comprising:
at least one wireless transmitter unit to be located by said wireless location system, wherein the at least one wireless transmitter unit transmits two wireless signals having a known time relationship and having different bandwidths, wherein the two wireless signals comprise an ultra wide band (UWB) signal and a narrower band signal, and wherein the UWB signal and the narrower band signal are both transmitted with a known time relationship between the UWB signal and the narrower band signal;
a plurality of receivers, wherein a first receiver receives and processes a first of the two wireless signals and estimates a time to arrive (TOA) of the first wireless signal, and a second receiver receives and processes a second of the two wireless signals and estimates a TOA of the second wireless signal at the second receiver, said second receiver selecting an earliest TOA of said received signals, wherein the plurality of receivers is time synchronized based on a common timing signal, and wherein at least one receiver of the plurality of receivers comprises:
a component that receives and processes each of said two wireless signals;
a component that estimates a TOA of each of said two wireless signals at said at least one receiver, wherein said TOAs estimated by the at least one receiver is referenced to synchronized time counters; and
a location server coupled to each of the plurality of receivers, the location server receiving the TOA of the first wireless signal from the first receiver and the selected TOA of the second wireless signal from the second receiver, the location server calculating a time difference of arrival (TDOA) of the two wireless signals and estimating a position of the at least one wireless transmitter unit based on the TDOA.

2. A wireless location system unit according to claim 1, wherein the UWB signal carries no data and the narrower band signal carries transmitter data.

3. A wireless location system in accordance with claim 1, wherein the location server estimates a position of the at least one wireless transmitter unit based on multiple TDOA calculations.

4. A wireless location system according to claim 3, wherein the common timing signal to time synchronize the plurality of receivers is a wireless signal.

5. A wireless location system in accordance with claim 1, wherein the TDOA comprises at least one TDOA value calculated from a difference of one TOA estimated on the transmitted UWB signal and a second TOA estimated on the transmitted narrower band signal.

6. A wireless location system according to claim 1, wherein at least one receiver is a transceiver and transmits the common timing signal.

7. A wireless location system according to claim 1, wherein at least one wireless tag at a known position transmits the common timing signal used to time synchronize the plurality of receivers.

8. A wireless location system in accordance with claim 1, wherein said TOA of each of said two wireless signals is referenced to a single time counter.

9. A wireless location system comprising:
   at least one wireless transmitter unit to be located by said wireless location system, wherein the at least one wireless transmitter unit transmits two wireless signals having a known time relationship and having different bandwidths;
   a plurality of receivers, wherein a first receiver receives and processes a first of the two wireless signals and estimates a time to arrive (TOA) of the first wireless signal, and a second receiver receives and processes a second of the two wireless signals and estimates a TOA of the second wireless signal at the second receiver, wherein the plurality of receivers is time synchronized based on a common timing signal; and
   a location server coupled to each of the plurality of receivers, the location server receiving the TOA of the first wireless signal from the first receiver and the TOA of the second wireless signal from the second receiver, the location server calculating a time difference of arrival (TDOA) of the two wireless signals and estimating a position of the at least one wireless transmitter unit based on the TDOA, wherein the location server assigns a quality factor to each TOA reported by the plurality of receivers, and wherein the estimated position of the wireless transmitter unit is based on the assigned quality factors.

10. A wireless location system in accordance with claim 1, wherein said at least one wireless transmitter unit is a wireless tag comprising:
   a first signal transmitter having a first signal antenna;
   a second signal transmitter having a second signal antenna; and
   a controller coupled to the first signal transmitter and the second signal transmitter.

11. A wireless location system in accordance with claim 10, wherein the wireless tag further comprises:
   a second signal receiver; and
   a switching unit coupled to the second signal transmitter and the second signal receiver,
   wherein the controller is coupled to the first signal transmitter, the second signal transmitter, and the second signal receiver.

12. A wireless location system in accordance with claim 11, wherein the second signal antenna is coupled to the switching unit.

13. A wireless location system comprising:
   at least one wireless transmitter unit to be located by said wireless location system, wherein the at least one wireless transmitter unit transmits two wireless signals having a known time relationship and having different bandwidths;
   a plurality of receivers, wherein a first receiver receives and processes a first of the two wireless signals and estimates a time to arrive (TOA) of the first wireless signal, and a second receiver receives and processes a second of the two wireless signals and estimates a TOA of the second wireless signal at the second receiver, wherein the plurality of receivers is time synchronized based on a common timing signal, wherein the TOA of the first and second signals are referenced to synchronized time counters, and wherein at least one of the plurality of receivers comprises:
      a first signal receiver;
      a second signal receiver;
      a first TOA circuit coupled to the first signal receiver to calculate the TOA of the first signal; and
      a controller coupled to the first TOA circuit, the second signal receiver, and means for processing the second signal, the controller calculating the TOA of the second signal; and
   a location server coupled to each of the plurality of receivers, the location server receiving the TOA of the first wireless signal from the first receiver and the TOA of the second wireless signal from the second receiver, the location server calculating a time difference of arrival (TDOA) of the two wireless signals and estimating a position of the at least one wireless transmitter unit based on the TDOA.

14. A wireless location system comprising:
   at least one wireless transmitter unit to be located by said wireless location system, wherein the at least one wireless transmitter unit transmits two wireless signals having a known time relationship and having different bandwidths;
   a plurality of receivers, wherein a first receiver receives and processes a first of the two wireless signals and estimates a time to arrive (TOA) of the first wireless signal, and a second receiver receives and processes a second of the two wireless signals and estimates a TOA of the second wireless signal at the second receiver, wherein the plurality of receivers is time synchronized based on a common timing signal, wherein the TOA of the first and second signals is referenced to synchronized time counters, and wherein at least one of the plurality of receivers are transceivers comprising:
      a first signal transceiver receiver;
      a second signal transceiver transmitter;
      a second signal transceiver receiver;
      a first TOA circuit coupled to the first signal transceiver receiver to calculate the TOA of the first signal;
      a controller coupled to the first TOA circuit, the second signal transceiver transmitter, and the second signal transceiver receiver, and means for processing the second signal, the controller calculating the TOA of the second signal;
      a switching unit coupled to the second signal transceiver transmitter, and the second signal transceiver receiver;

a first signal transceiver antenna coupled to the first signal transceiver receiver; and a second signal transceiver antenna coupled to the switching unit; and a location server coupled to each of the plurality of receivers, the location server receiving the TOA of the first wireless signal from the first receiver and the TOA of the second wireless signal from the second receiver, the location server calculating a time difference of arrival (TDOA) of the two wireless signals and estimating a position of the at least one wireless transmitter unit based on the TDOA.

15. A method for estimating a time of arrival (TOA) of a wireless transmission at a wireless receiver, comprising:

transmitting an ultra wide band (UWB) signal and a narrower band signal from a single wireless device, the UWB signal and the narrower band signal having a known time relationship;

receiving the UWB signal and the narrower band signal at a receiver unit, the receiver unit processing the UWB signal and the narrower band signal and estimating a TOA of the UWB signal and a TOA of the narrower band signal at said receiver unit, said TOAs of said received signals being referenced to synchronized time counters; and selecting an earliest TOA between the TOA of the UWB signal and the TOA of the narrower band signal.

16. A method according to claim 15, further comprising estimating a quality of the estimated TOA values.

17. A method according to claim 16, further comprising correcting the TOA of the narrower band signal by using the TOA of the UWB signal.

18. A method according to claim 15, wherein the earliest TOA is reported to a location server coupled to the receiver unit.

19. A method according to claim 18, wherein a TOA of a non-selected signal is also reported by the receiver unit.

* * * * *

UNITED STATES PATENT AND TRADEMARK OFFICE
CERTIFICATE OF CORRECTION

PATENT NO. : 8,208,939 B2  
APPLICATION NO. : 12/025184  
DATED : June 26, 2012  
INVENTOR(S) : Aljadeff et al.

Page 1 of 1

It is certified that error appears in the above-identified patent and that said Letters Patent is hereby corrected as shown below:

Claim 2, col. 13, line 1, "location system unit according to" should read --location system according to--.

Signed and Sealed this
Thirtieth Day of October, 2012

David J. Kappos
*Director of the United States Patent and Trademark Office*